(12) United States Patent
McNicol et al.

(10) Patent No.: US 10,168,025 B2
(45) Date of Patent: Jan. 1, 2019

(54) ROTATING BEACON

(71) Applicant: ORCA GROUP LIMITED, Central Hong Kong (CN)

(72) Inventors: Marc McNicol, Broadbeach (AU); Zhiqiang Huang, New Taipei (CN)

(*) Notice: Subject to any disclaimer, the term of this patent is extended or adjusted under 35 U.S.C. 154(b) by 0 days.

(21) Appl. No.: 15/337,392

(22) Filed: Oct. 28, 2016

(65) Prior Publication Data

US 2017/0045204 A1    Feb. 16, 2017

Related U.S. Application Data

(63) Continuation-in-part of application No. PCT/AU2015/050200, filed on Apr. 28, 2015.

(30) Foreign Application Priority Data

Apr. 28, 2014  (CN) .......................... 2014 2 2094456
May 15, 2014  (AU) ............................... 2014901809
Apr. 28, 2015  (WO) ................. PCT/AU2015/050200

(51) Int. Cl.
| F21V 21/30 | (2006.01) |
| F21V 14/04 | (2006.01) |
| F21S 10/06 | (2006.01) |
| B60Q 1/26 | (2006.01) |
| F21V 29/77 | (2015.01) |
| F21V 29/83 | (2015.01) |
| F21V 29/89 | (2015.01) |
| B60Q 1/52 | (2006.01) |
| F21S 8/10 | (2006.01) |
| F21V 7/06 | (2006.01) |

(Continued)

(52) U.S. Cl.
CPC ............ *F21V 14/04* (2013.01); *B60Q 1/2611* (2013.01); *B60Q 1/52* (2013.01); *F21S 10/063* (2013.01); *F21S 48/234* (2013.01); *F21S 48/328* (2013.01); *F21V 7/06* (2013.01); *F21V 17/14* (2013.01); *F21V 29/77* (2015.01); *F21V 29/83* (2015.01); *F21V 29/89* (2015.01); *F21V 31/005* (2013.01); *F21Y 2115/10* (2016.08)

(58) Field of Classification Search
CPC ............................ F21S 10/063; B60Q 1/2611
See application file for complete search history.

(56) References Cited

U.S. PATENT DOCUMENTS 3,764,799 A * 10/1973 Schulz ................. B60Q 1/2611
                                                        340/472
4,970,627 A * 11/1990 Beaumont ............ B60Q 1/2611
                                                        362/272

(Continued)

*Primary Examiner* — Evan Dzierzynski
(74) *Attorney, Agent, or Firm* — Blake E. Vande Garde; Erickson Kernell IP, LLC

(57) ABSTRACT

There is provided a beacon assembly (10) including an integral cast metal mounting base (11) having a mounting flange (12) bounded by a ventilated side wall portion (16) and an upper wall portion (17) combining to support integral cooling fins (20). The side wall portion (16), transparent housing (23) and mounting base (11) form an upper chamber (24). An integrally formed motor housing portion (32) supports a synchronous DC motor (36) driving an input spur gear (44) meshed with a carrier (53) and gear belt (58) assembly supporting a metallized polymer parabolic reflector (56). The thermal mount (30) mounts an LED Array (60) using thermal paste at the reflector (56) focal point.

18 Claims, 10 Drawing Sheets

(51) Int. Cl.
*F21V 17/14* (2006.01)
*F21V 31/00* (2006.01)
*F21Y 115/10* (2016.01)

(56) References Cited

U.S. PATENT DOCUMENTS

| | | | |
|---|---|---|---|
| 5,517,388 A * | 5/1996 | Hutchisson | B60Q 1/2611 362/284 |
| 2014/0085072 A1* | 3/2014 | Clifford | B60Q 1/2611 340/472 |

* cited by examiner

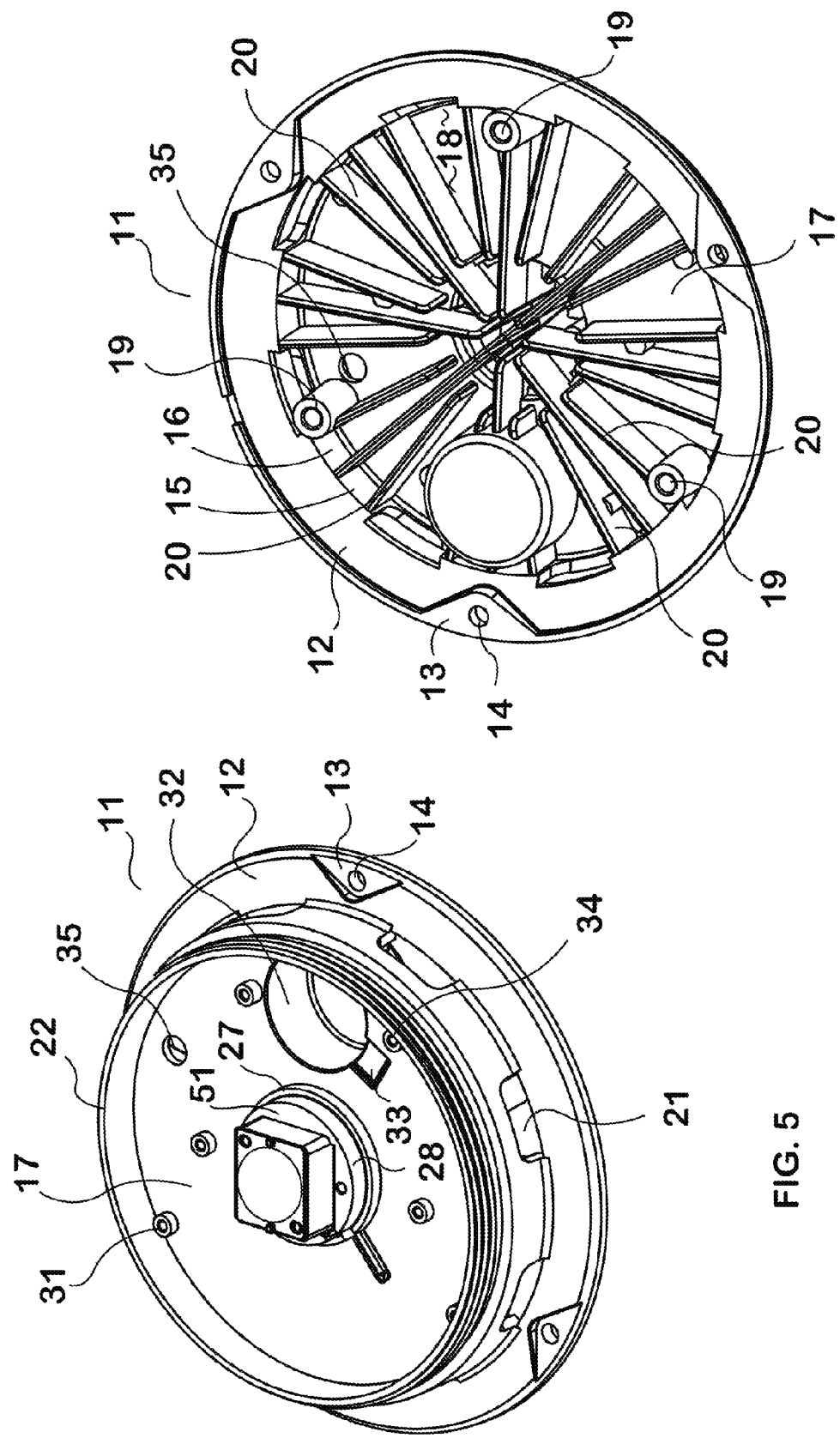

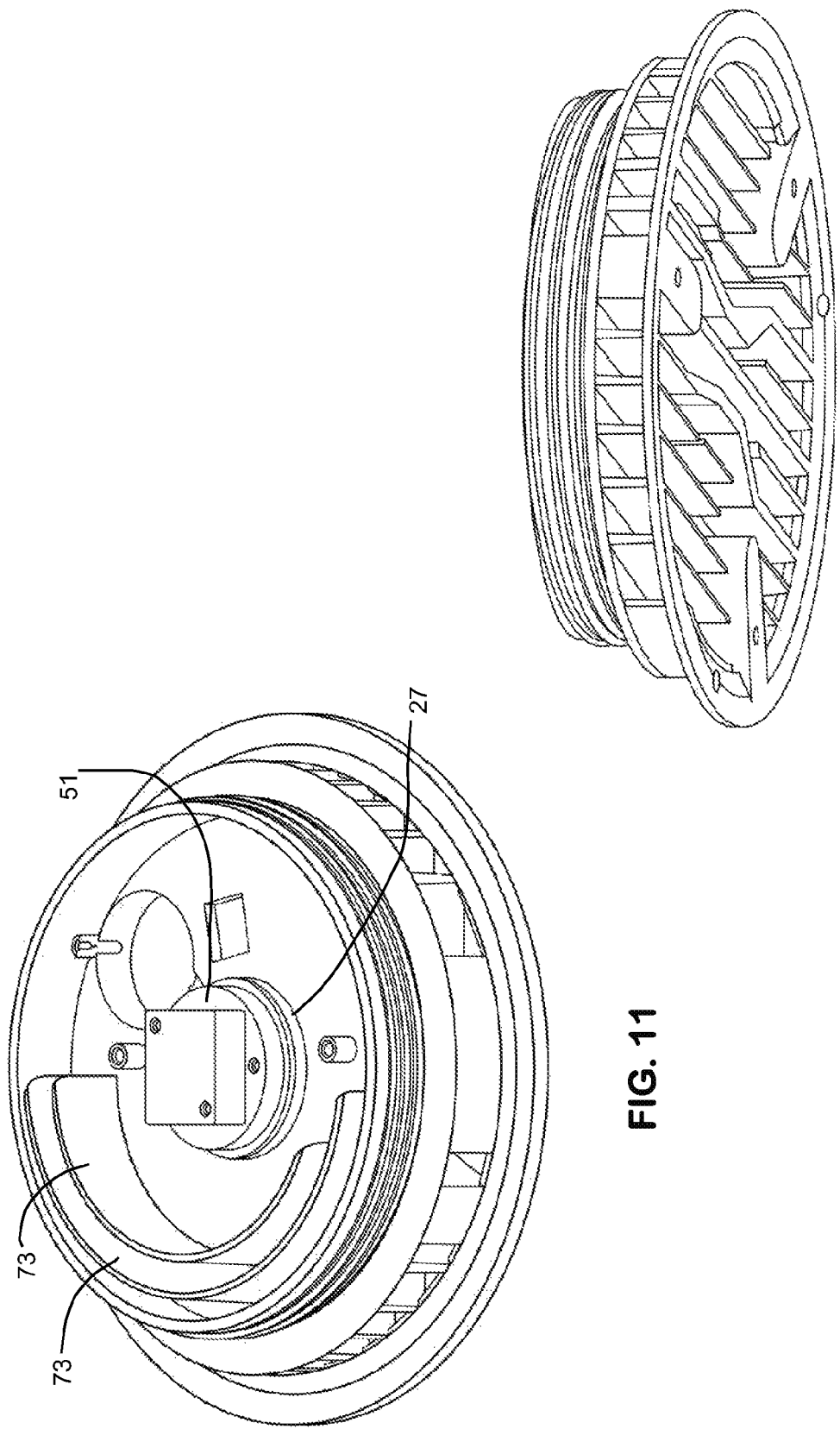

ROTATING BEACON

FIELD OF THE INVENTION

This invention relates to rotating beacons. This invention has particular application to rotating beacons for vehicular use, and for illustrative purposes the invention will be described with reference to this application. However, it is envisaged that this invention will find application in for example warning devices on fixed installations.

BACKGROUND OF THE INVENTION

Rotating beacons have been a mainstay of emergency service vehicles for many years. In its most fundamental a rotating beacon comprises a continuous light source that is focused into a beam and is either rotating or, more commonly, is located at the focus of a rotating reflector. The focussing element is most usually a parabolic reflector.

A rotating reflector may comprise the focussing element, but need not necessarily be so. For example, a parabolic focussing reflector may direct a beam into a rotating plane mirror. The optical parts are generally housed in an optically transparent dome closed over a base assembly including the motor components necessary to rotate the reflector and to lead in electrical power the motor and lamp.

One example of an incandescent-globe illuminated rotating beacon is that disclosed in DE 4304216 A1 published 18 Aug. 1992. A beacon has a stationary halogen lamp (16) mounted on a bearing bracket (31), which is arranged on a lamp base (11). A vertical light beam is generated by the lamp (16) and parabolic reflector (17), and is turned into a substantially horizontal plane by a motor-driven plane mirror (24). The lamp (16) is mounted from below in the bracket.

The technology is constructed to accommodate the considerable heat generated by the QH globe. With a yield of 24 lumens/Watt and an overall thermodynamic efficiency of 3.5%, a 50 W lamp beams at 1200 lumens while generating 48.25 W of heat. While most of the heat is radiated out with the light, the rotating beacon must deal with heat generated by conduction and convection heating of the beacon components.

With the advent of high intensity LEDs, there are examples of rotating beacons using this solid state technology. Typically, a polymer lower housing mounts an LED assembly including a heat sink, a driver circuit, and an electric motor driving a rotating parabolic reflector. The reflector is housed in a transparent polycarbonate upper housing. While the LEDs are more efficient at 14%, a 30 Watt LED array would generate about 26 Watts of heat, substantially all of which would be retained by the heat sink. In a closed system the heat build-up is such that high intensity LED beacons are not used beyond about 10 Watts. Even at this low power, the housing must be ventilated, exposing the electronics to the environment. The light output of the diodes varies with temperature.

US2012182730A1 discloses a plurality of LEDs of differing colours and disposed in groups circumferentially spaced about an axis. The plurality of LEDs is encompassed by a two-lens optical system comprising a collimating lens and a condensing, coupling lens. The groups are selectively illuminated for a rotating effect or another pattern. This has the disadvantage in a beacon of only applying a fraction of the available intensity at any one time in the momentary direction of sweep.

US2012250312A1-1 discloses a semi-parabolic reflector assembly rotated by a side mounted, belt driven motor assembly. The reflector is stated to have an aperture into which an integral base extension protrudes as a heat sink, the base extension supporting the LEDs in an array centred substantially at the focal point of the semi-parabolic reflector. The belt drive necessitates a conventional electric motor that resists the inherent side loads of the belt, which raises the profile of the apparatus. The reflector bearing must necessarily be large and robust. There is a great deal of clutter in the space available for ventilation. It confines the space available for control elements such as a PCB.

BRIEF SUMMARY OF THE INVENTION

In one aspect the present invention resides broadly in a rotating beacon including:

a heat conducting mounting base having a ventilated lower chamber, said lower chamber including cooling fins integrally formed with said mounting base;

a substantially cylindrical transparent housing secured to said mounting base and forming a substantially closed upper chamber;

a reflector assembly including a reflector of substantially part parabolic shape mounted on a carrier in said upper chamber, said reflector describing a solid or rotation substantially conforming to an inner cylindrical surface of said housing and said carrier comprising an annular body mounting said reflector and supported for rotation on said mounting base about an axis passing substantially through the focal point of said reflector, said carrier including a peripheral ring gear portion adapted to be gear driven by a motor assembly; and a light emitting diode (LED) assembly thermally coupled to an integrally formed portion of said mounting base which extends through said annular body and locates said diode assembly to emit light substantially at said focal point.

The heat conducting mounting base may be formed from any suitable material including but not limited to metals such as aluminium, zinc or conductive composites such as carbon fibre. The heat conducting mounting base may be monolithic or may be fabricated. The mounting base may for example be lost wax cast or die cast in aluminium alloy or zinc.

The lower chamber may be defined by a side wall portion having a lower edge adapted to be mounted to a surface such as a vehicle roof, and an upper wall portion. The side wall portion may include openings in the form of one or more apertures or reliefs in the lower edge. The side wall portion and/or the upper wall portion may be provided with cooling surface-increasing devices such as integral cooling fins.

The mounting base may be integrally formed with a peripherally-threaded wall portion adapted to secure the substantially transparent housing to the mounting base. The assembly may be further sealed by a gasket or O-ring. Alternatively, the substantially transparent housing may be an interference fit, bayonet fit, and/or O-ring-sealed sliding fit to the mounting base.

The substantially transparent housing may be formed of any suitable material such as class or optically clear polymer. For example, the substantially transparent housing may be formed of polycarbonate, acrylic or styrene polymer. The substantially transparent housing may be coloured. The substantially transparent housing may be formed with integral lensing components such as Fresnel lens components. The substantially transparent housing may be of any shape.

However, as the substantially transparent housing contains a rotating reflector it is envisaged that the shape will always be a shape of rotation such as a sphere or a cylinder.

The reflector may be formed of metallized glass or plastic or coated or polished metal. The reflector may be a full parabola. However, in view of a configuration of most sources and in order to increase the reflective surface area, the reflector may have a reflective surface shaped as part of a much larger parabolic surface. To this end it may be preferred to use a substantially transparent housing of generally cylindrical shape, and to configure a substantially straight-edged, part parabolic reflector of size selected to rotate in close conformity to an inner cylindrical and/or upper circular surface of the substantially transparent housing.

The reflector may be mounted on the annular body for rotation in the upper chamber by any suitable means. For example, the reflector may be mounted to rotate or orbit about an axis that substantially contains the focal point of the reflector. Where the reflector is configured to sweep the reflected beacon around the horizon, the reflector may be mounted on rotating means associated with either the top of the substantially transparent housing or the mounting base.

The annular body mounting said reflector may be supported for rotation on said mounting base by a plain bearing or bush or ball bearing assembly. The annular body may be die cast or otherwise provided with a peripheral gear mounting portion, whereby the peripheral ring gear portion may comprise an elastomeric gear belt frictionally engaged with said peripheral gear mounting portion. The gear belt may comprise a silicone rubber gear belt. It has been surprisingly determined that the low inertia of an axially short, lightweight die case annular carrier and a metallized polymer reflector mounted on a small bearing can be driven by a metal pinion interacting with an elastomeric gear belt functioning as a ring gear, without slipping or shredding the belt.

The motor assembly may include a DC brushless electric motor driving a pinion. Such motors are low profile and result in a proportionate device. As observed, the pinion may be a metal such as steel or brass. The motor may be located relative to the mounting base by any suitable means including by precision-location in a motor housing formed integrally in the act of moulding or casting the mounting base. It has been found that typical service life for a well-regulated (thermally) LED array is 20-30,000 hours.

Typically motors used in rotating beacons have an operating life of less than 5000 hours. The preferred brushless motors provide an operating life of up to 50000 hours. Typically, this type of motor has a short profile compared to the other motor types being used, which is advantageous in reducing height and weight of the base casting. However, the short profile presents a challenge in that the drive shaft is not as well suited to radial loading (such as by the prior art belt drives) when compared to the other motors typically used; side loading reduces the service life considerably. Thus a gear drive arrangement is more suited in order to achieve an operating lifespan for the entire product of up to 20000-30000 hours.

Typical brushless DC motors use a rotating permanent magnet in the rotor, and stationary electrical current/coil magnets on the motor housing for the stator. A motor controller is required that converts DC to AC (with which the motor is synchronous); this may be inherent in the motor assembly or may be optimized on an external circuit board, typically mounted on the mounting base.

The light emitting diode (LED) assembly may be a high power, multiple-semiconductor-device. For example, the LED assembly may be the metallic chassis, multiple-bead arrangements or LED arrays such as those marketed by CREE of North Carolina. For example, the CREE® XLamp® CXA1816 LED Array delivers high lumen output and high efficacy in a single package.

| | |
|---|---|
| Size (mm × mm) | 17.85 × 17.85 |
| Maximum power (W) | 38 |
| Light output (lm) | 1700-3800 |

The LED assembly may be associated with a driver circuit formed on a circuit board, which may also comprise a motor controller. In a specific embodiment, the printed circuit board may be formed from thermally conductive aluminium and is mounted to a heat sink comprising the mounting base with a heat conducting compound.

In the case of substantially transparent housing top-mounting the means for rotating the reflector, electrical conductors may be secured to the substantially transparent housing. For example, the substantially transparent may be secured to the mounting base using a rotate and lock method and the electrical conductors may comprise two strands formed from electrically conductive aluminium. Each strand may be secured to the inside face of the substantially transparent housing and may provide an electrical connection from the base to a motor that is secured into the closed upper end of the substantially transparent housing.

BRIEF DESCRIPTION OF THE DRAWINGS

FIG. 5 is a top perspective view of the cast base of the beacon of FIG. 1;

FIG. 6 is a bottom perspective view of the cast base of the beacon of FIG. 1;

FIG. 11 is a top perspective view of the cast base of the apparatus of FIG. 7; and FIG. 12 is a bottom perspective view of the cast base of the apparatus of FIG. 7.

DETAILED DESCRIPTION OF THE EMBODIMENTS

Figure 1:
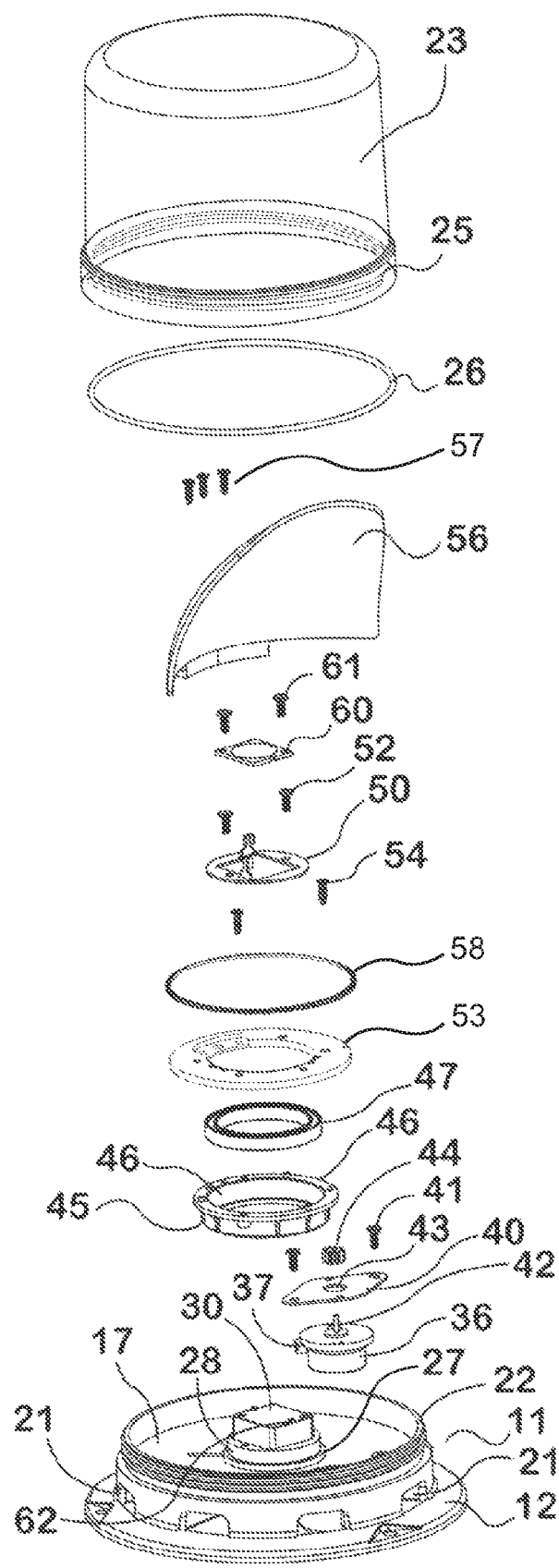
FIG. 1 is an exploded perspective view of a rotating beacon in accordance with an embodiment of the present invention.
Figure 2:
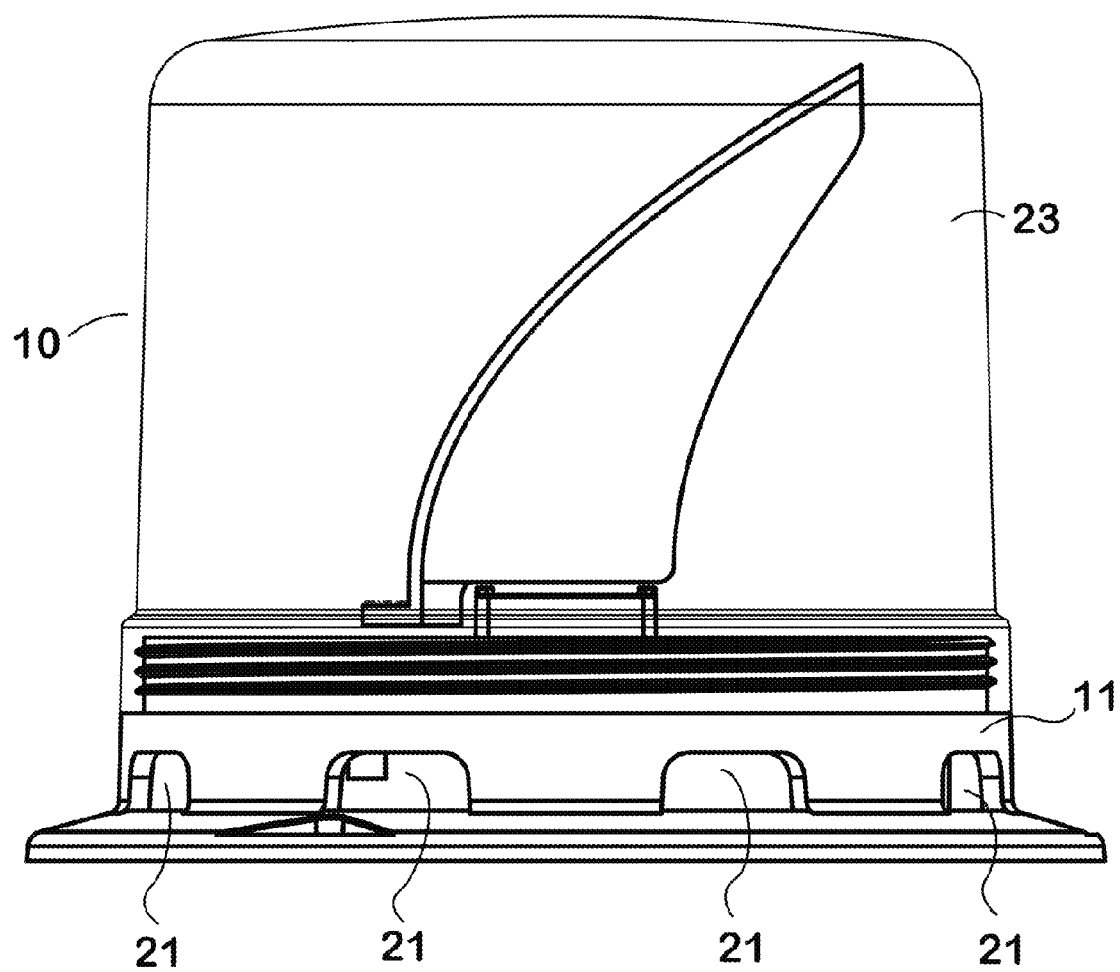
FIG. 2 is a side view of the beacon of FIG. 1.
Figure 3:
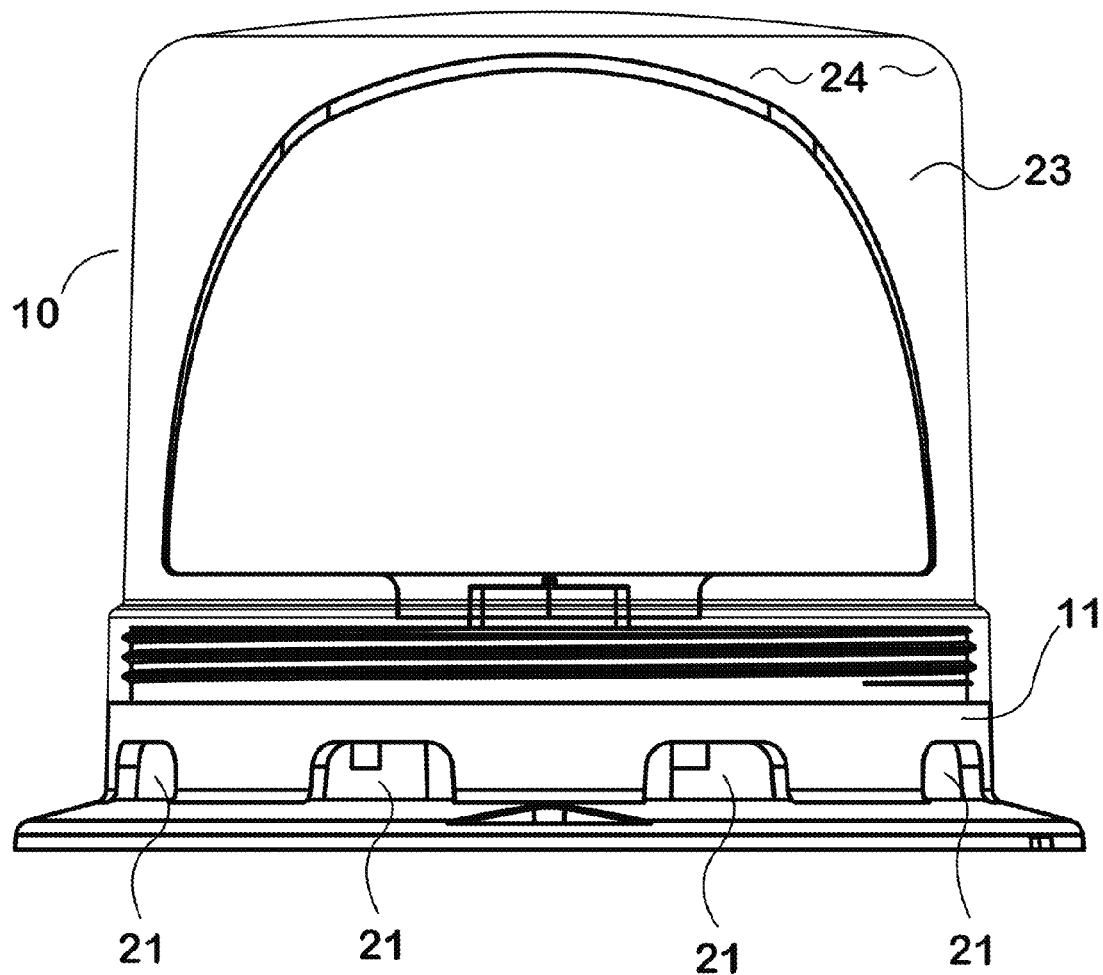
FIG. 3 is a front view of the beacon of FIG. 1.
Figure 4:
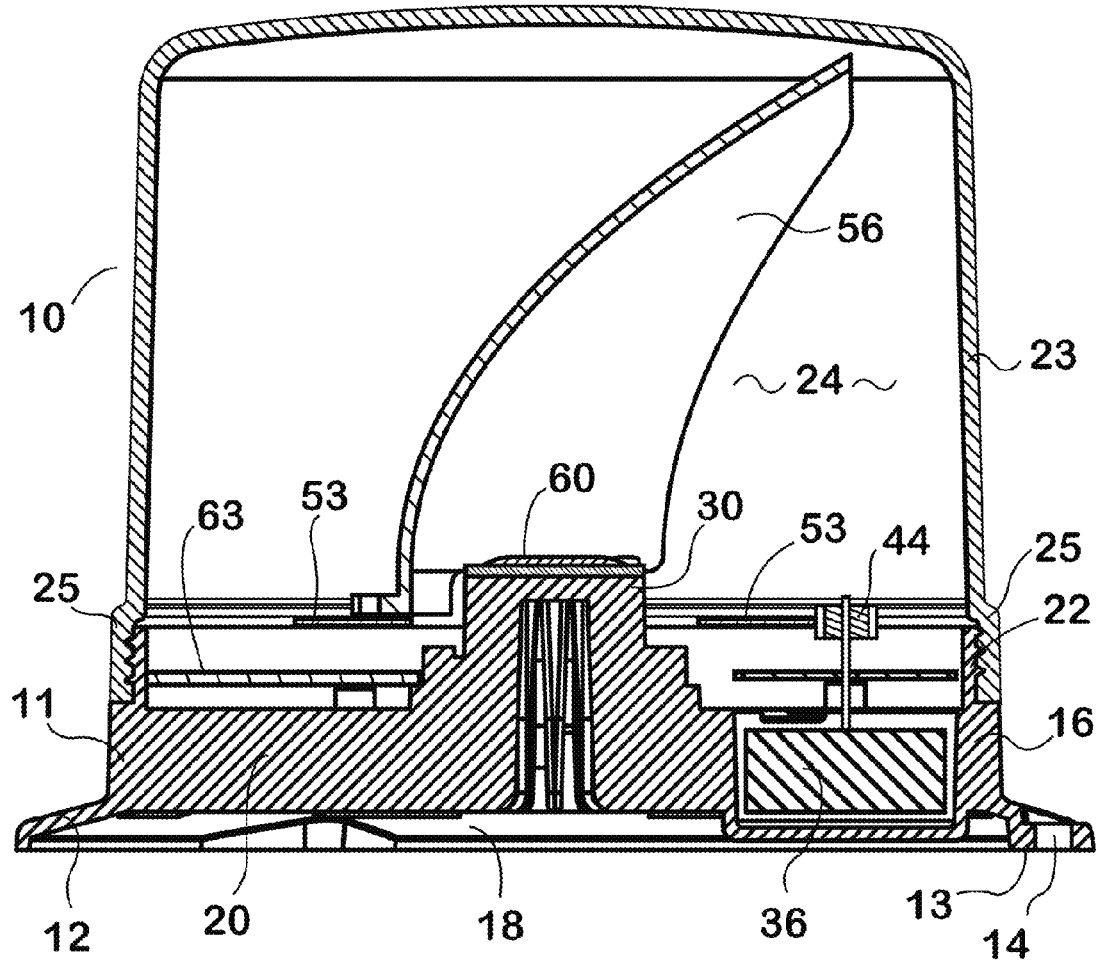
FIG. 4 is a vertical section through the beacon of FIG. 1.

In the FIGS. 1 to 6 there is provided a beacon assembly 10 including a mounting base 11 of cast aluminium alloy. The mounting base 11 is an integral, one-piece casting having formed therein a mounting flange 12 incorporating mounting pads 13 and bolt holes 14. The mounting flange is bounded at its inner periphery 15 by a side wall portion 16, which is closed over intermediate its height by an upper wall portion 17 to form a lower chamber 18. The side 16 and upper 17 wall portions support integrally formed cooling fins 20. The side wall portion 16 is relieved by eight ventilation ports 21. The casting is provided with alternative threaded mounting bolt posts 19 for enabling the base 11 to be blind-fixed from below.

The side wall portion 16 extends above the upper wall portion 17 to provide a substantially cylindrical mounting spigot 22 on which is supported a polycarbonate transparent housing 23 and which forms, with the mounting base 11, an upper chamber 24. The mounting spigot 22 is threaded to engage a corresponding threaded portion 25 of the transparent housing 23, the upper chamber 24 being environmentally sealed by O-ring 26.

The upper wall portion 17 is integrally formed with, on its upper surface, a bearing land 27, inner bearing surface 28, LED assembly thermal mount 30, circuit board mounting posts 31, motor housing portion 32, anti-torque lug recess 33, motor retainer plate posts 34 and electrical cable lead-out 35.

A synchronous DC motor 36 is located in the motor housing portion 32 and is secured against counter rotation by an anti-torque lug 37 adapted to engage the lug recess 33. The motor 36 is retained in the motor housing portion 32 by apertured retainer plate 40 and machine screws 41. The motor shaft 42 passes through the aperture 43 in the retainer plate 40 and is terminated by a spur gear 44.

A bearing housing 45 has a gear mounting flange 46 and a sleeve portion into which the outer periphery of a low friction ball bearing assembly 47 is located. The inner periphery of the bearing assembly 47 is located over onto the inner bearing surface 28 until it contacts the bearing land 27. A bearing retainer plate 50 is secured to the top 51 of the inner bearing mount 28 by machine screws 52.

An annular, die-cast reflector and gear carrier 53 is mounted to the gear mounting flange 46 by machine screws 54, and in turn mounts a metallized polymer parabolic reflector 56 by machine screws 57, and a silicone rubber gear belt 58. The reflector 56 is maximized for height and width in the upper chamber. The gear belt 58 meshes with the input spur gear brass pinion 44 to provide a substantially silent reduction drive between the motor 36 and the reflector 56.

A CREE® XLamp® CXA1816 LED Array 60 is installed to the LED assembly thermal mount 30 using thermal paste and machine screws 61, the contact tails (not shown) being led out through respective milled cut-outs 62 which are sealed from below the upper wall portion 17.

The motor 36 and LED array 60 are controlled by a circuit board 63 connected via DC leads (not shown) passing through the electrical cable lead-out 35. The contact tails (not shown) led out through respective milled cut-outs 62 are also terminated on the circuit board 63. The circuit board 63 is physically supported on the mounting base by circuit board mounting posts 31.

Figure 7:
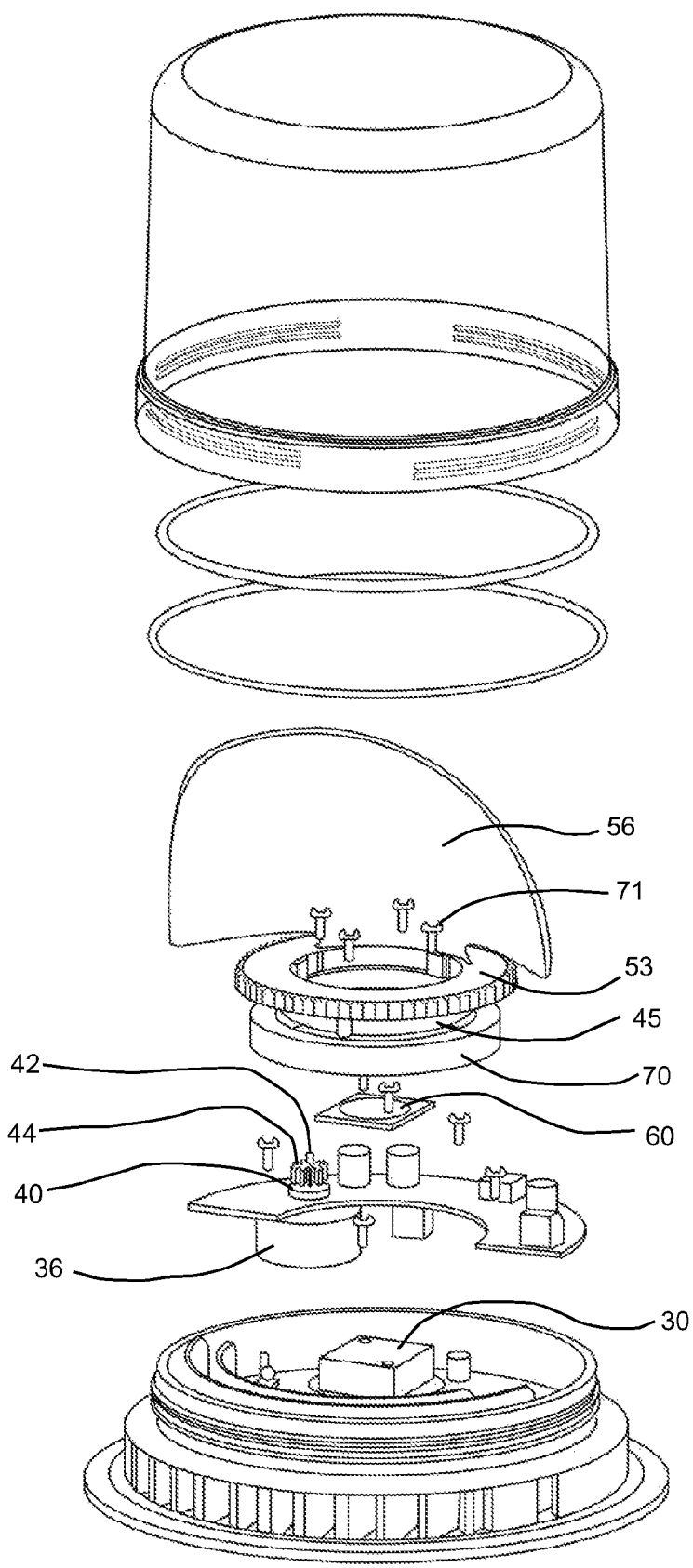
FIG. 7 is an exploded perspective view of an alternative embodiment of a rotating beacon in accordance with an embodiment of the present invention.
Figure 8:
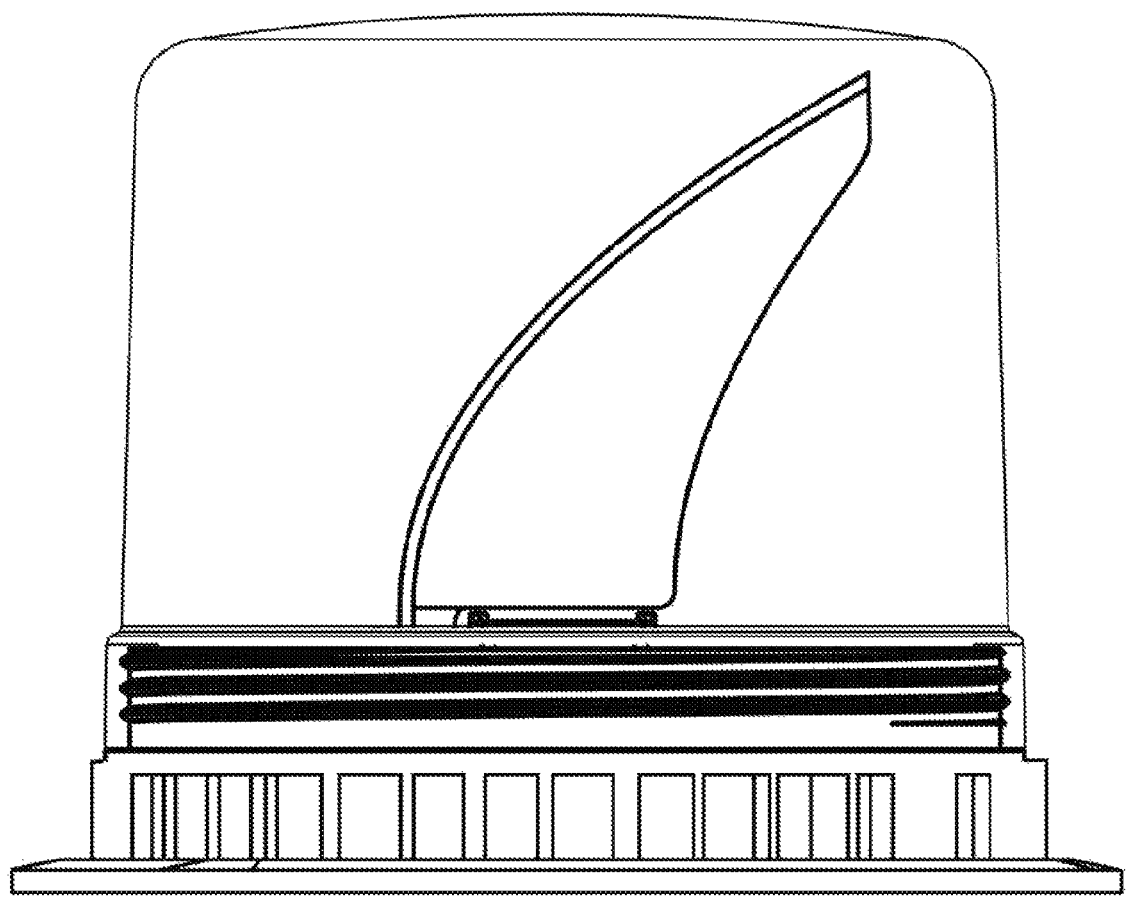
FIG. 8 is a side view of the apparatus of FIG. 7.
Figure 9:
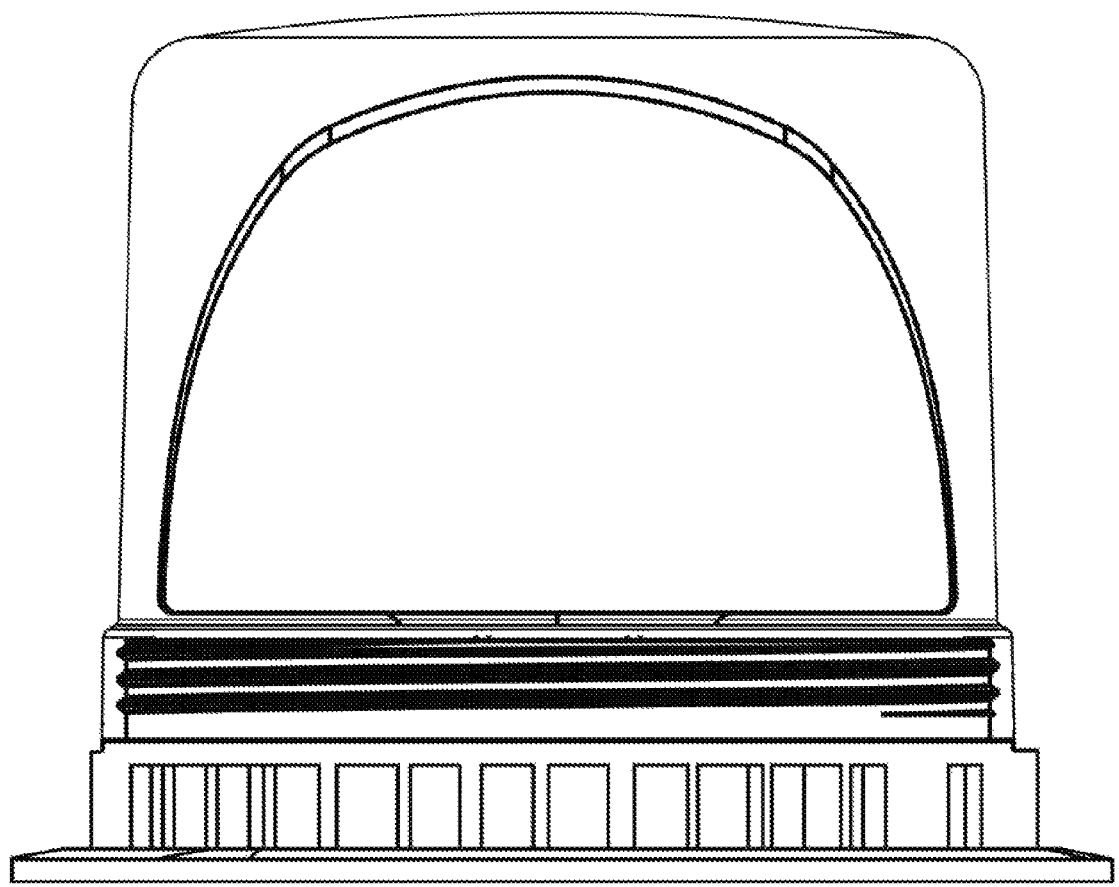
FIG. 9 is an end view of the apparatus of FIG. 7.
Figure 10:
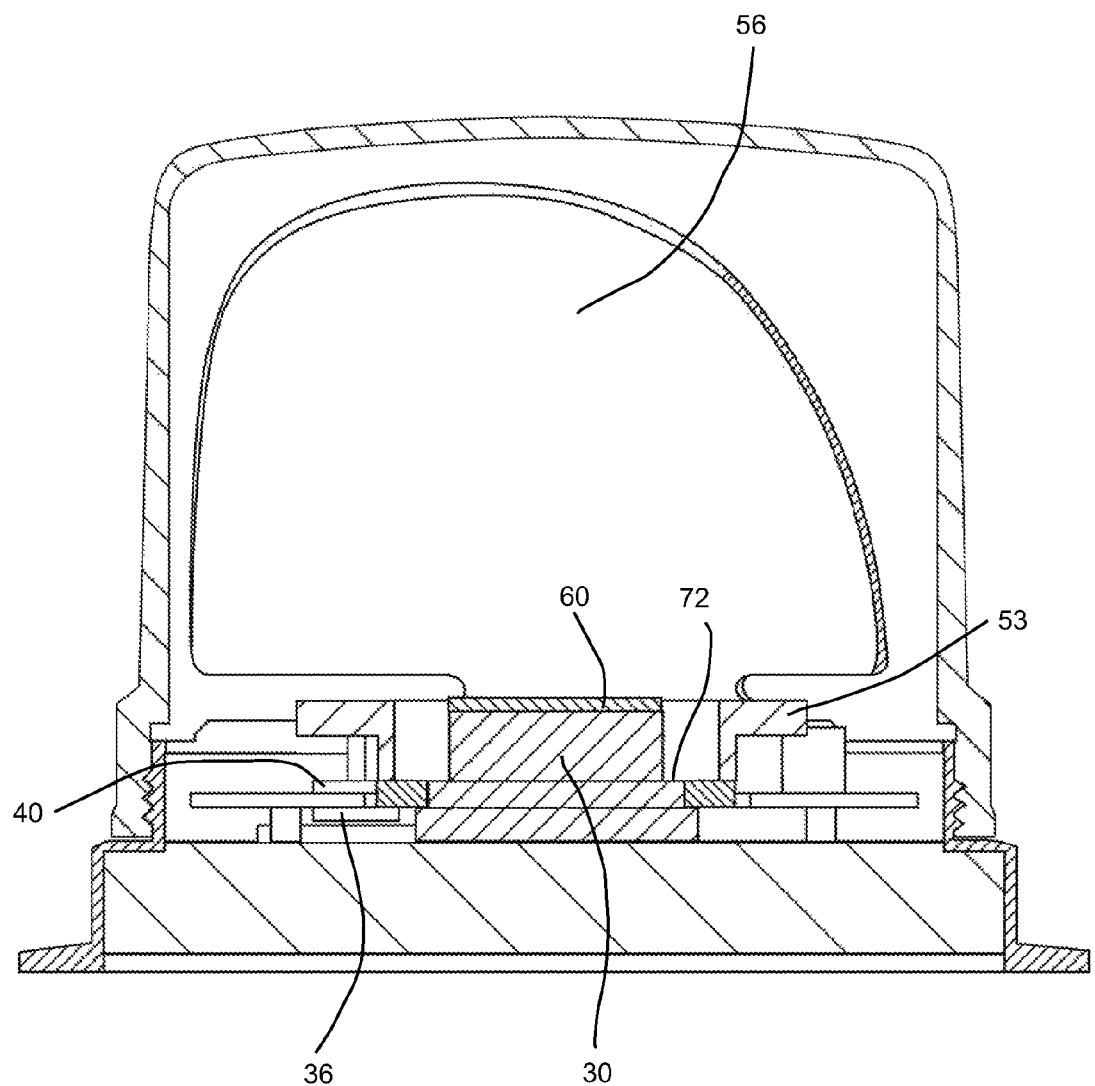
FIG. 10 is a vertical section view of the apparatus of FIG. 7.

In the embodiment of FIGS. 7 to 12, like components have like numerals with the embodiment of FIGS. 1 to 6. In the second embodiment, the reflector 56 and annular gear 53 are integrally formed of a metallized polymer material to simplify the construction. The bearing housing 45 receives a bearing or a low friction thrust bush 70 is retained to the integral annular gear 53 by set screws 71. A corresponding land 72 is formed about the LED thermal mount 30 to form a thrust face for the bearing or bush 70.

In this embodiment the synchronous DC motor 36 is mounted directly to the circuit board 63, simplifying the wiring arrangement.

Apparatus in accordance with both of the above embodiment is substantially hermetically sealed, reducing condensation within the upper chamber. The implications for management of heat from the high power LED module are dealt with by the use of an integrally cast aluminium alloy base including integral ventilation ports and multiple cooling fins while providing a sturdy and stable base for mounting the beacon. The reflector elevation area is maximized.

In the second embodiment these advantages are yet further enhanced by moving the motor to the circuit board, liberating space for the inclusion of integrally cast, concentric cooling fins 73. While the air within the cover 23 is heated by the electronic components, the rotation of the reflector creates a circulation passing air over the cooling fins 73, which are integral with the heat sink provided by the cast base 11. In this embodiment the circuit board is limited to a part circular shape in order to expose the cooling fins 73.

The present invention utilizes a pinion and ring gear assembly that eliminates the disadvantage of coaxial mounting of the motor. The use of an open centred ring gear assembly allows the use of a small bearing or bush between the heat sink pillar supporting the LED array. The axial extent of the rotating parts beneath the reflector per se increases the air circulation for cooling. The preferred finning tis thereby made more effective. Gear drive ameliorates side loading and premature failure of DC synchronous motors. The use of a ring gear assembly comprising a ring gear mount and a silicon rubber gear belt substantially eliminates gear noise. The relatively reduced bulk and inertia of the rotating parts makes the use of a silicone belt unexpectedly possible.

The above embodiments of the present invention are illustrative and not limiting. Various alternatives and equivalents are possible. Other additions, subtractions or modifications are obvious in view of the present disclosure and are intended to fall within the scope of the appended claims.

We claim:
1. A rotating beacon including:
a heat conducting mounting base having a ventilated lower chamber, said lower chamber including cooling fins integrally formed with said mounting base;
a substantially cylindrical transparent housing secured to said mounting base and forming a substantially closed upper chamber;
a reflector assembly including a reflector of substantially part parabolic shape mounted on a carrier in said upper chamber, said reflector describing a solid or rotation substantially conforming to an inner cylindrical surface of said housing and said carrier comprising an annular body mounting said reflector and supported for rotation on said mounting base about an axis passing substantially through the focal point of said reflector, said carrier including a peripheral ring gear portion adapted to be gear driven by a motor assembly; and
a light emitting diode (LED) assembly thermally coupled to an integrally formed portion of said mounting base which extends through said annular body and locates said diode assembly to emit light substantially at said focal point.

2. A rotating beacon according to claim 1, wherein the heat conducting mounting base is formed by casting in metal.

3. A rotating beacon according to claim 2, wherein the metal is aluminium alloy.

4. A rotating beacon according to claim 1, wherein the lower chamber is defined by a side wall portion having a lower edge adapted to be mounted to a surface, and an upper wall portion.

5. A rotating beacon according to claim 4, wherein the ventilation of the lower chamber is provided by one or more apertures or reliefs in the lower edge.

6. A rotating beacon according to claim 1, wherein the mounting base is integrally formed with a peripherally-threaded wall portion adapted to secure the substantially transparent housing to the mounting base.

7. A rotating beacon according to claim 6, wherein a join between the mounting base and the substantially transparent housing is sealed with an O-ring.

8. A rotating beacon according to claim 1, wherein the substantially transparent housing is formed of polycarbonate, acrylic or styrene polymer.

9. A rotating beacon according to claim 1, wherein the reflector is formed of a material selected from metallized glass or plastic, or coated or polished metal.

10. A rotating beacon according to claim 1, wherein said annular body mounting said reflector is supported for rotation on said mounting base by a plain bearing or bush.

11. A rotating beacon according to claim 10, wherein said annular body includes a peripheral gear mounting portion and peripheral ring gear portion comprises an elastomeric gear belt frictionally engaged with said peripheral gear mounting portion.

12. A rotating beacon according to claim 11, wherein said gear belt comprises a silicone rubber gear belt.

13. A rotating beacon according to claim 1, wherein the motor assembly includes a DC brushless electric motor driving a pinion.

14. A rotating beacon according to claim 13, wherein the motor is precision-located in a motor housing formed integrally in the act of moulding or casting the mounting base.

15. A rotating beacon according to claim 13, wherein the LED assembly is associated with a driver circuit formed on a circuit board, which circuit also comprises a motor controller for said DC motor.

16. A rotating beacon according to claim 15, wherein the circuit board is part circular to expose a portion of said top wall, the exposed portion having at least one integrally formed cooling fin substantially concentric with said side wall.

17. A rotating beacon according to claim 1, wherein the light emitting diode (LED) assembly is a high power, multiple-semiconductor-device.

18. A rotating beacon according to claim 17, wherein the LED assembly is selected from metallic chassis, multiple-bead arrangements.

* * * * *